United States Patent
Johnson et al.

(10) Patent No.: US 11,405,793 B2
(45) Date of Patent: Aug. 2, 2022

(54) CONCURRENT USAGE AND SCANNING OF WIRELESS CHANNELS FOR DIRECT DFS TO DFS CHANNEL SWITCHING

(71) Applicant: Shure Acquisition Holdings, Inc., Niles, IL (US)

(72) Inventors: Eric Johnson, Norridge, IL (US); Haneef Charania, Glenview, IL (US); Mike Handler, Niles, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 119 days.

(21) Appl. No.: 17/039,336

(22) Filed: Sep. 30, 2020

(65) Prior Publication Data

US 2021/0099889 A1  Apr. 1, 2021

Related U.S. Application Data

(60) Provisional application No. 62/908,229, filed on Sep. 30, 2019.

(51) Int. Cl.
*H04W 16/14* (2009.01)
*H04W 76/15* (2018.01)
*H04W 72/04* (2009.01)

(52) U.S. Cl.
CPC ....... *H04W 16/14* (2013.01); *H04W 72/0453* (2013.01); *H04W 76/15* (2018.02)

(58) Field of Classification Search
CPC . H04W 16/14; H04W 72/0453; H04W 76/15; H04W 84/12
See application file for complete search history.

(56) References Cited

U.S. PATENT DOCUMENTS

| | | | |
|---|---|---|---|
| 6,697,013 B2 | 2/2004 | McFarland |
| 6,834,045 B1 | 12/2004 | Antti |
| 6,870,815 B2 | 3/2005 | McFarland |
| 7,155,230 B2 | 12/2006 | Tsien |
| 7,535,868 B2 | 5/2009 | Black |
| 8,249,003 B2 | 8/2012 | Hasegawa |
| 8,400,938 B2 | 3/2013 | Matsuura |
| 8,432,826 B2 | 4/2013 | Heidari |
| 8,805,420 B2 | 8/2014 | Kenney et al. |
| 8,873,523 B2 | 10/2014 | Bradley |
| 8,937,928 B2 | 1/2015 | Ngo |
| 9,131,504 B2 | 9/2015 | Kenney et al. |
| 9,357,404 B2 | 5/2016 | Kamlani |

(Continued)

FOREIGN PATENT DOCUMENTS

| | | |
|---|---|---|
| CN | 102577525 | 7/2012 |
| EP | 1257090 | 11/2002 |

(Continued)

OTHER PUBLICATIONS

International Search Report and Written Opinion for PCT/US2018/037133 dated Sep. 12, 2018.

(Continued)

*Primary Examiner* — Steven H Nguyen
(74) *Attorney, Agent, or Firm* — Neal, Gerber & Eisenberg LLP

(57) ABSTRACT

Systems and methods are described for concurrent usage and scanning of wireless channels, particularly with respect to dynamic frequency selection (DFS) and non-DFS channels.

20 Claims, 5 Drawing Sheets

(56) References Cited

U.S. PATENT DOCUMENTS

| | | | |
|---|---|---|---|
| 9,357,492 B2 | 5/2016 | Malik | |
| 9,543,635 B2 | 1/2017 | Schulz | |
| 9,565,684 B2 | 2/2017 | Barkay | |
| 9,622,089 B1 | 4/2017 | Ngo et al. | |
| 9,622,161 B1 | 4/2017 | Law | |
| 9,635,649 B1 * | 4/2017 | Amiri | H04W 16/14 |
| 2004/0151137 A1 * | 8/2004 | McFarland | H04W 72/02 |
| | | | 370/341 |
| 2005/0215266 A1 | 9/2005 | Tsien | |
| 2010/0197317 A1 | 8/2010 | Sadek | |
| 2011/0096739 A1 | 4/2011 | Heidari | |
| 2013/0314267 A1 | 11/2013 | Kenney et al. | |
| 2014/0003237 A1 | 1/2014 | Kenney | |
| 2014/0086081 A1 | 3/2014 | Mack | |
| 2014/0301328 A1 | 10/2014 | Yacovitch | |
| 2015/0163828 A1 | 6/2015 | Vandwalle | |
| 2015/0256323 A1 | 9/2015 | Gandarillas Diego | |
| 2016/0014824 A1 | 1/2016 | Chao | |
| 2016/0087897 A1 | 3/2016 | Hardt | |
| 2016/0227416 A1 | 8/2016 | Suzuki | |
| 2016/0345323 A1 | 11/2016 | Krishnamoorthy | |
| 2017/0026988 A1 | 1/2017 | Guo | |
| 2017/0034707 A1 | 2/2017 | Green | |
| 2017/0034755 A1 | 2/2017 | Casebolt | |
| 2017/0055200 A1 | 2/2017 | Hassan | |
| 2017/0094556 A1 | 3/2017 | Homchaudhuri | |
| 2017/0118699 A1 | 4/2017 | Law | |
| 2017/0142728 A1 * | 5/2017 | Tsai | H04W 74/0808 |
| 2019/0342795 A1 * | 11/2019 | McFarland | H04W 28/18 |

FOREIGN PATENT DOCUMENTS

| | | |
|---|---|---|
| EP | 1257091 | 11/2002 |
| EP | 1374618 | 1/2004 |
| EP | 1393502 | 3/2004 |
| EP | 1405463 | 4/2004 |
| EP | 1562333 | 8/2005 |
| EP | 1645158 | 4/2006 |
| WO | 2002082844 | 10/2002 |
| WO | 2002093839 | 11/2002 |
| WO | 2003005643 | 1/2003 |
| WO | 2005009068 | 1/2005 |
| WO | 2016110046 | 7/2016 |
| WO | 2018098913 | 6/2018 |

OTHER PUBLICATIONS

System Planning OpenStage WL 3/OpenStage WL3 Plus Planning Guide, Unify Software and Solutions GmbH & Co KG, 34 pp., Dec. 2015.

Wireless Design Considerations for Industrial Applications, Cisco, Rockwell Automation, 97 pp., Jan. 2014.

* cited by examiner

CONCURRENT USAGE AND SCANNING OF WIRELESS CHANNELS FOR DIRECT DFS TO DFS CHANNEL SWITCHING

CROSS-REFERENCE TO RELATED APPLICATION

This application claims the benefit of U.S. Provisional Patent application No. 62/908,229, filed on Sep. 30, 2019, the contents of which are fully incorporated herein by reference.

TECHNICAL FIELD

This disclosure relates to the field of wireless communication, and more particularly, to scanning and using both dynamic frequency selection (DFS) and non-DFS channels designated within the 2.4 GHz and 5 GHz frequency bands.

BACKGROUND

Audio production can involve the use of many components, including microphones, wireless audio transmitters, wireless audio receivers, recorders, and/or mixers for capturing, recording, and presenting the sound of productions, such as television programs, newscasts, movies, live events, and other types of productions. The microphones typically capture the sound of the production, which is wirelessly transmitted from the microphones and/or the wireless audio transmitters to the wireless audio receivers. The wireless audio receivers can be connected to a recorder and/or a mixer for recording and/or mixing the sound by a crew member, such as a production sound mixer. Electronic devices, such as computers and smartphones, may be connected to the recorder and/or mixer to allow the crew member to monitor audio levels and timecodes.

Wireless audio transmitters, wireless audio receivers, wireless microphones, and other portable wireless communication devices include antennas for transmitting and receiving radio frequency (RF) signals which contain digital or analog signals, such as modulated audio signals, data signals, and/or control signals. Users of portable wireless communication devices include stage performers, singers, actors, news reporters, and the like.

A wireless audio transmitter may transmit an RF signal that includes an audio signal to a wireless audio receiver. The wireless audio transmitter may be included in a wireless handheld microphone, for example, that is held by the user and includes an integrated transmitter and antenna. When the RF signal is received at the wireless audio receiver, the RF signal may be degraded due to multipath fading caused by constructive interference and/or by other types of interference. This degradation may cause the RF signal to have a poor signal-to-noise ratio (SNR), which can result in bit errors that can cause audio artifacts and muting of the resulting output audio. However, muting the output audio is undesirable in many situations and environments, such as during professional stage productions and concerts. The effects of such multipath fading and interference are most prevalent in harsh RF environments where physical and electrical factors influence the transmission and reception of RF signals, e.g., movement of the microphone within the environment, other RF signals, operation in large venues, etc.

To alleviate issues with multipath fading of RF signals, and for various other reasons, wireless audio components may utilize frequency diversity and/or antenna diversity techniques. Accordingly, there is an opportunity for a wireless audio receiver system that addresses these concerns. More particularly, there is an opportunity for a wireless audio receiver system that makes us of both DFS and non-DFS channels.

SUMMARY

Systems and methods for concurrent usage and scanning of wireless channels are provided. According to a particular and non-limiting aspect, an example method for wireless communication may include setting a current operating channel of a primary radio to a DFS channel. The method may also include scanning a plurality of available channels using a secondary radio, and determining a channel score for each of the available channels. The method may further include determining a non-DFS backup channel for the primary radio based on the channel scores, determining a candidate DFS backup channel for the primary radio based on the channel scores, and setting a primary radio backup channel to the non-DFS backup channel. The method may still further include, while operating the primary radio on the DFS channel, vetting the candidate DFS backup channel using the secondary radio, detecting a primary radio event on the current operating channel of the primary radio, and responsive to both vetting the candidate DFS channel and detecting the primary radio event, switching the current operating channel of the primary radio from the DFS channel to the candidate DFS backup channel.

An example wireless communication device of the present disclosure may include a primary radio, a secondary radio, and a processor. The processor may be configured to set a current operating channel of the primary radio to a DFS channel, scan a plurality of available channels using the secondary radio, and determine a channel score for each of the available channels. The processor may further be configured to determine a non-DFS backup channel for the primary radio based on the channel scores, determine a candidate DFS backup channel for the primary radio based on the channel scores, and set a primary radio backup channel to the non-DFS backup channel. The processor may still further be configured to, while operating the primary radio on the DFS channel, vet the candidate DFS backup channel using the secondary radio, detect a primary radio event on the current operating channel of the primary radio, and responsive to both vetting the candidate DFS channel and detecting the primary radio event, switch the current operating channel of the primary radio from the DFS channel to the candidate DFS backup channel.

In a third example, a non-transitory, computer readable medium may have instructions stored thereon that, when executed by a processor, cause the performance of a set of actions. The set of action may include setting a current operating channel of a primary radio to a DFS channel, scanning a plurality of available channels using a secondary radio, and determining a channel score for each of the available channels. The set of actions further includes determining a non-DFS backup channel for the primary radio based on the channel scores, determining a candidate DFS backup channel for the primary radio based on the channel scores, and setting a primary radio backup channel to the non-DFS backup channel. The set of actions still further includes, while operating the primary radio on the DFS channel, vetting the candidate DFS backup channel using the secondary radio, detecting a primary radio event on the current operating channel of the primary radio, and responsive to both vetting the candidate DFS channel and detecting the primary radio event, switching the current operating channel of the primary radio from the DFS channel to the candidate DFS backup channel.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION OF EXEMPLARY EMBODIMENTS

Figure 1:
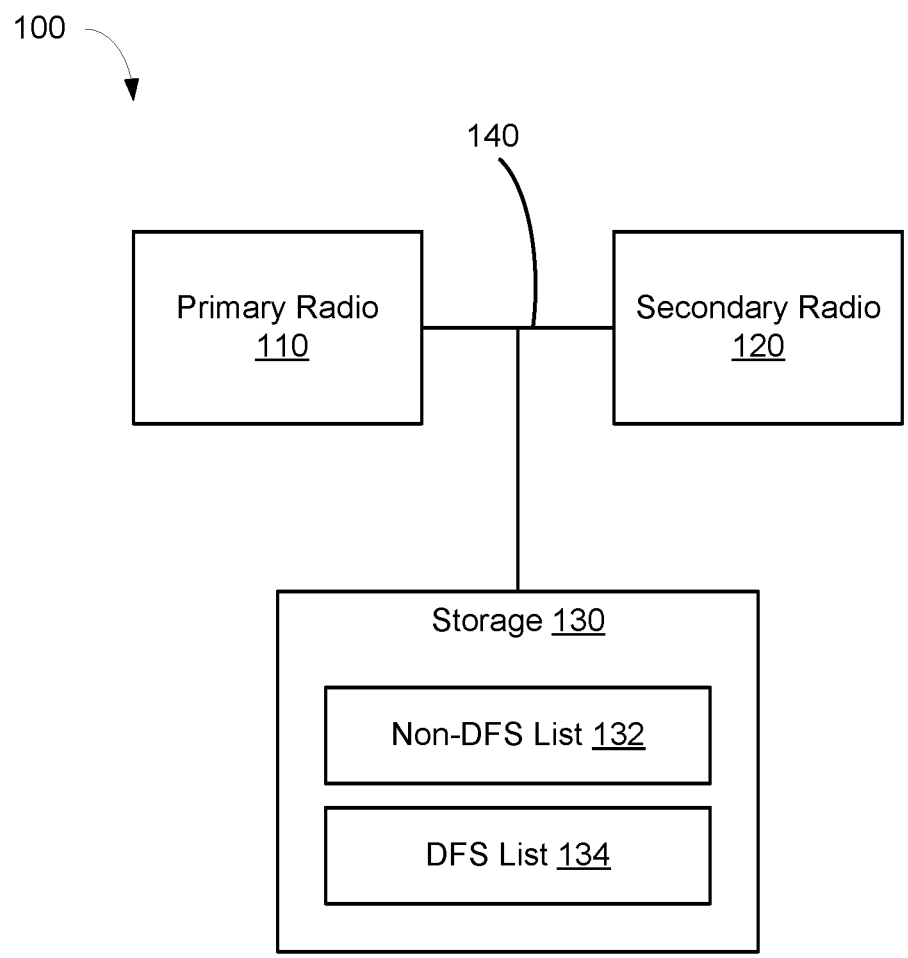
FIG. 1 is a schematic diagram of an example system according to embodiments of the present disclosure.

The description that follows describes, illustrates and exemplifies one or more particular embodiments of the invention(s) in accordance with its principles. This description is not provided to limit the invention(s) to the embodiments described herein, but rather to explain and teach the principles of the invention(s) in such a way to enable one of ordinary skill in the art to understand these principles and, with that understanding, be able to apply them to practice not only the embodiments described herein, but also other embodiments that may come to mind in accordance with these principles. The scope of the invention(s) is/are intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates the didactic purpose of the specification. Additionally, the drawings set forth herein are not necessarily drawn to scale, and in some instances proportions may have been exaggerated to more clearly depict certain features. Such labeling and drawing practices do not necessarily implicate an underlying substantive purpose. Furthermore, one or more drawings herein may be of a purely functional schematic nature, or a combination of a functional and structural/hardware schematic nature, intended to disclose and teach functional aspects of the subject matter without necessarily limiting the disclosure to any specific structure/hardware. As stated above, the present specification is intended to be taken as a whole and interpreted in accordance with the principles of the invention(s) as taught herein and understood to one of ordinary skill in the art.

With respect to the exemplary systems, components and architecture described and illustrated herein, it should also be understood that the invention(s) may be embodied by, or employed in, numerous configurations and components, including one or more system, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system. Furthermore, although one or more systems, devices, apparatuses, and other components may be described, all methods, systems, and articles of manufacture consistent with known architecture for these components are intended to be encompassed. For example, a processor may be implemented as part of one or more components as a microprocessor, microcontroller, application specific integrated circuit (ASIC), discrete logic, or a combination of other type of circuits or logic. Similarly, memories as part of one or more of these components may be DRAM, SRAM, Flash or any other type of memory. Flags, data, databases, tables, and other data structures may be separately stored and managed, may be incorporated into a single memory or database, may be distributed, or may be logically and physically organized in many different ways. Software programs, which may be described in terms of one or more code segments, may be parts of a single program, separate programs, or distributed across several memories and processors. The methods and functionality described herein may be implemented via hardware, software, and/or firmware, and processed by one or more processor-based systems, components or devices. Such methods and functionality may be described as a module or engine with the understanding that its implementation is not limited to any particular hardware, software, firmware, or device configuration, but rather encompassing all implementations/embodiments within the skill of one of ordinary skill in the art. Systems may be implemented in hardware, software, or a combination of hardware and software in one processing system or distributed across multiple processing systems. Accordingly, the invention(s) should not be construed as limited by the exemplary embodiments described herein or any of the associated didactic schematics.

Certain embodiments, examples, and descriptions included herein are discussed with particular reference to usage in the field of audio transmission and reception, or other audio based uses. However, it should be understood that the principles disclosed herein also apply to any context in which DFS channels are used. For example, a Wi-Fi or LTE access point that includes the use of DFS channels may make use of the features disclosed herein. While the embodiments and examples disclosed herein focus on a use in the audio field, similar operational benefits can be taken advantage of in other contexts as well.

FIG. 1 illustrates a simplified block diagram of an example system 100 according to embodiments of the present disclosure. System 100 may include a primary radio 110, a secondary radio 120, and a storage 130, all communicatively coupled via a communication path 140.

Primary radio 110 and secondary radio 120 may be configured to transmit and/or receive signals at various frequencies and with various characteristics. For instance, primary radio 110 and secondary radio 120 may be configured to operate using channels in the 2.4 GHz and 5 GHz bands that are both dynamic frequency selection (DFS) and non-DFS channels. System 100 may prioritize operation using DFS channels, which may tend to be faster and less populated than non-DFS channels.

Dynamic frequency selection (DFS) may refer to the mechanism by which unlicensed devices are allowed to operate on a particular frequency band, such as the 5 GHz range of frequencies. This range may enable devices to transmit and receive information with a higher bandwidth, speed, and/or other characteristic as compared to other frequency bands. But frequencies in this band may be allocated to radar systems, such as for weather, air traffic, and military applications. As such, while these frequencies may be generally available for use by unlicensed devices, governmental or industry regulations may require devices operating on some of these frequencies to automatically switch off of the frequency/channel (i.e., to a non-DFS channel or un-used DFS channel) when a radar signal is detected.

As such, examples disclosed herein may refer to DFS channels and non-DFS channels, either of which may include channels that operate in the 2.4 GHz and 5 GHz bands (e.g., for Wi-Fi communication). It should be noted, however, that embodiments disclosed herein may be applied to other frequency ranges.

In some examples, system 100 may make use of both radios 110 and 120 to perform one or more aspects described herein. For instance, primary radio 110 and/or secondary radio 120 may be configured to scan available non-DFS and DFS channels, to determine various characteristics of the channels used to determine channel scores. In some examples, one, two, or more primary and/or secondary radios may be used to perform a scan of various wireless channels. The channels can then be ranked according to their channel scores, such that the primary and/or secondary radios 110 and 120 can be operated on the best possible channels (or most preferred channels), so as to provide the best possible performance. In some examples, radios 110 and/or 120 may be coupled to a processor (not shown) which may, among other things, control the operation of the radios (i.e., which channel is the current operating channel, and which channel is the backup channel), analyze scanning data, determine channel scores, determine channel rankings, and otherwise carry out the various functions and method steps disclosed herein. To perform the functions and method steps, the processor may be communicatively coupled with the storage 130. In one example, the processor is configured to determine a ranking or order of the non-DFS and DFS channels based on one or more criteria or characteristics of the various available channels, which may be stored in storage 130 as the non-DFS list 132 and DFS list 134 respectively.

As used herein, the term "backup channel" can refer to a wireless channel that serves as a secondary channel to which the primary radio can switch. The backup channel is not a fixed channel, but is rather an identifier that can be applied to a channel at any given time, referring to a preferred channel for switching the primary radio to under various circumstances. In some examples, the terms "non-DFS backup channel" and "candidate DFS backup channel" are used. It should be appreciated that a non-DFS backup channel is a potential channel that is a non-DFS channel, and which is considered a channel to which the primary radio can be switched under various circumstances. Furthermore, the candidate DFS backup channel is a term that refers to a given DFS channel at various points during operation of the systems and devices described herein. The candidate DFS backup channel is a placeholder term that refers to a given channel at certain points, and should not be understood as being overly limiting. As would be understood by one of ordinary skill in the art, a backup channel, non-DFS backup channel, candidate backup channel, and various other terms used herein should be understood as applying to wireless channels generally based on the descriptions and uses of the terms herein, and should not be viewed as limiting based on the specific words that are used. These terms and their usage in practice are discussed in further detail below with respect to specific embodiments.

Furthermore, the term "channel score" is used herein as an example metric for ranking various channels. It should be appreciated that a channel score may include objective and subjective considerations, such that a channel score may not refer solely to a number that ranks the channel. A numerical ranking may be a part of the channel score, however the decisions and determinations made in examples disclosed herein based upon channel scores can include subjective considerations as well. For example, a first wireless channel may have a higher numerical value associated with it than a second wireless channel, however for various reasons the first wireless channel may not be preferred. As such, the second wireless channel may nevertheless have a higher "channel score."

In some examples, the non-DFS list 132 and DFS list 134 may include all accessible channels ranked according to their respective channel scores. The channel scores may be determined by weighting one or more characteristics, such as (1) the channel quality, which may measure a current relative quality of the channel as determined by the percentage of packet retries, the current noise floor, and the duty cycle of various devices on the channel (i.e., non-Wi-Fi devices), (2) the availability, which may measure the percentage of the channel currently available for use, (3) the utilization, which may measure the percentage of the channel being used, (4) the Wi-Fi utility, which may measure the percentage of the channel being used by Wi-Fi devices (where appropriate), and (5) the interference utility, which may measure the percentage of the channel being used by non Wi-Fi interference and Wi-Fi ACI (adjacent channel interference) (where appropriate). Other characteristics may be considered as well. Further, the list(s) and/or channel scores may factor in whether a radar signal is present on each channel.

Figure 2:
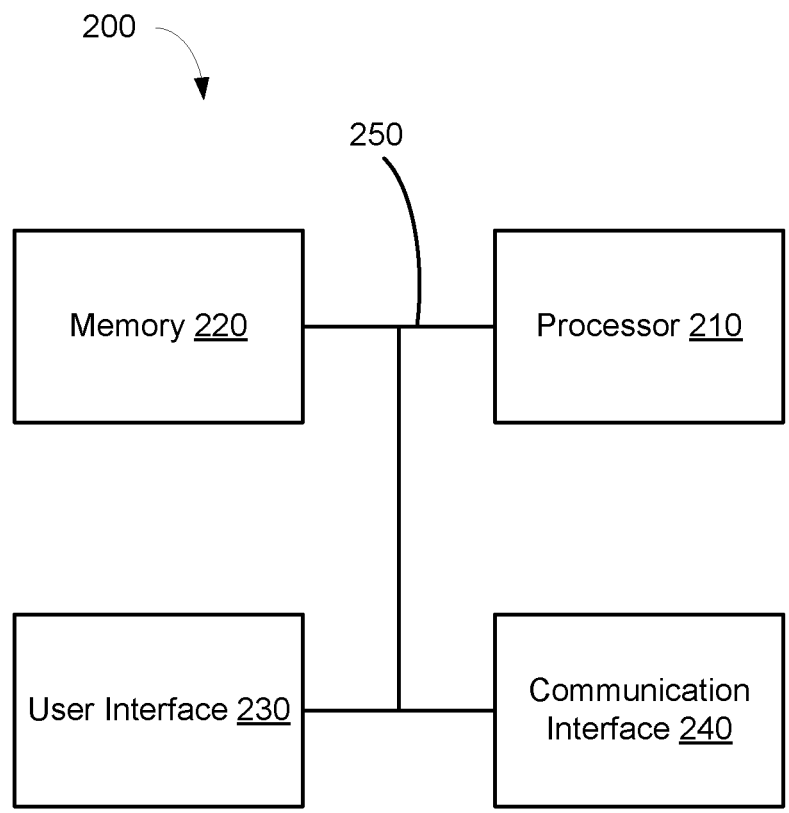
FIG. 2 illustrates a simplified block diagram of an example computing device capable of supporting and facilitating one or more aspects described herein.

FIG. 2 illustrates a simplified block diagram of an example computing device 200 according to embodiments of the present disclosure. Computing device 200 may be configured to perform a variety of functions or acts, such as those described in this disclosure (and accompanying drawings). The computing device 200 may include various components, including for example, a processor 210, memory 220, user interface 230, and communication interface 240, all communicatively coupled by system bus, network, or other connection mechanism 250. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein.

Processor 210 may include a general purpose processor (e.g., a microprocessor) and/or a special purpose processor (e.g., a digital signal processor (DSP)). Processor 210 may be any custom made or commercially available processor. Processor 210 may also represent multiple parallel or distributed processors working in unison.

Memory 220 may include one or more volatile (e.g., random access memory (RAM, such as DRAM, SRAM, SDRAM, etc.)) and nonvolatile (e.g., ROM, hard drive, flash drive, CDROM, etc.), removable, and/or non-removable storage components, such as magnetic, optical, or flash storage, and may be integrated in whole or in part with the processor 210. These and other components may reside on devices located elsewhere on a network or in a cloud arrangement. Further, the memory 220 may take the form of a non-transitory computer-readable storage medium, having stored thereon program instructions (e.g., compiled or non-compiled program logic and/or machine code) that, when executed by the processor 210, cause the device 200 to perform one or more functions or acts, such as those described in this disclosure. Such program instructions may define or be part of a discrete software application that can be executed in response to certain inputs received from the user interface 230 and/or communication interface 240, for instance. Memory 220 may also store other types of information or data, such as those types described throughout this disclosure.

User interface 230 may facilitate interaction with a user of the device, if applicable. As such, user interface 230 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 230 may also comprise devices that communicate with inputs or outputs, such as a short-range transceiver (RFID, Bluetooth, etc.), a telephonic interface, a cellular communication port, a router, or other types of network communication equipment. The user interface 230 may be internal to the computing device 200, or may be external and connected wirelessly or via connection cable, such as through a universal serial bus port.

Communication interface 240 may be configured to allow the device 200 to communicate with one or more devices (or systems) according to one or more protocols. In one example, the communication interface 240 may be a wired interface, such as an Ethernet interface or a high-definition serial-digital-interface (HD-SDI). As another example, the communication interface 240 may be a wireless interface, such as a cellular or Wi-Fi interface. In some examples, each of a plurality of computing devices 200 and/or other devices or systems on a network may be configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while some embodiments may include computing device 200 having a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

In the context of this document, a "computer-readable medium" may be any means that can store, communicate, propagate, or transport data objects for use by or in connection with the systems and methods as described herein. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The systems, devices, and methods can be embodied in any type of computer-readable medium for use by or in connection with an instruction execution system or apparatus, such as a computer.

Figure 3:
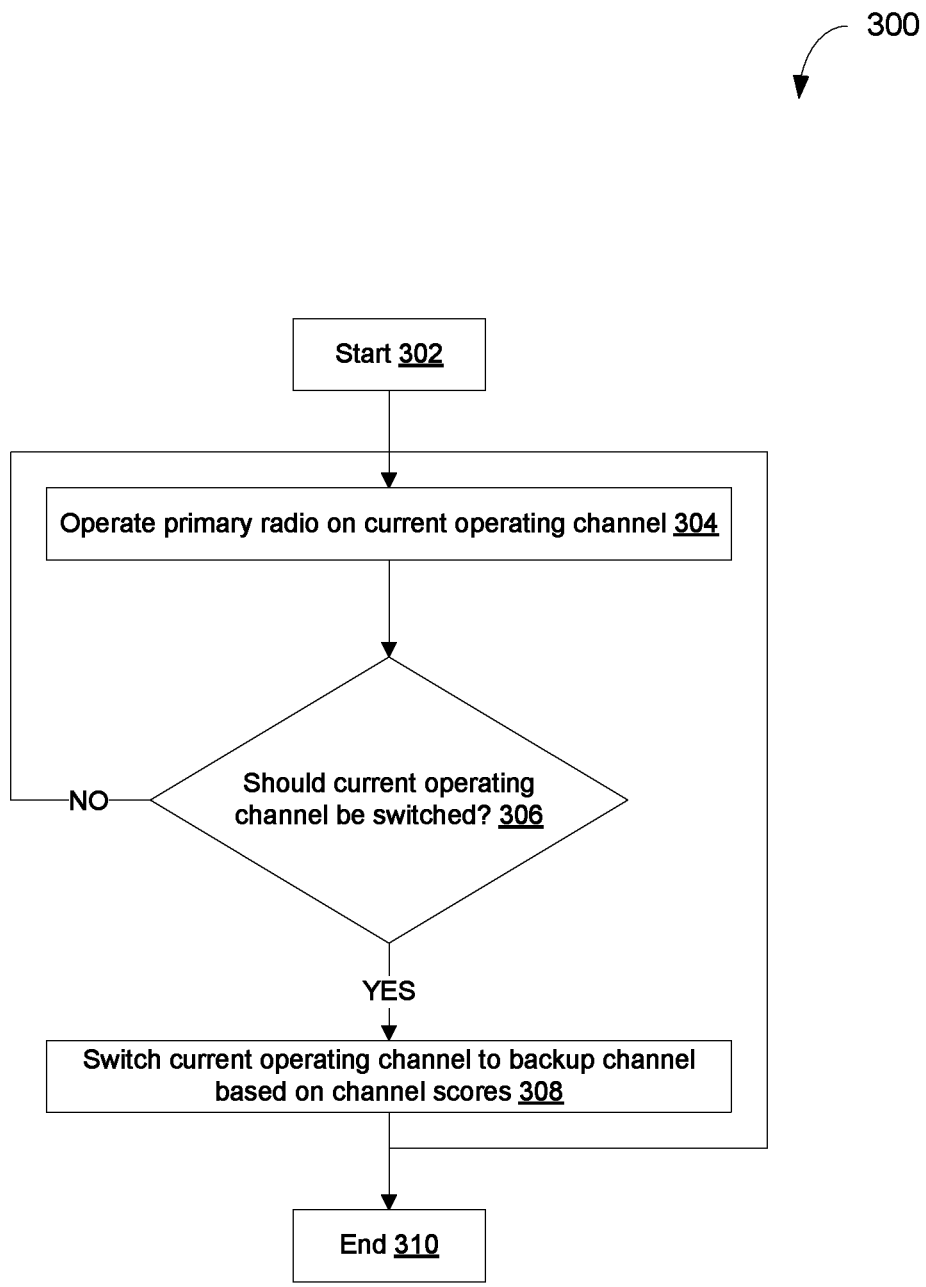
FIG. 3 illustrates a flowchart of an example method of operating a wireless communication device according to embodiments of the present disclosure.
Figure 4A:
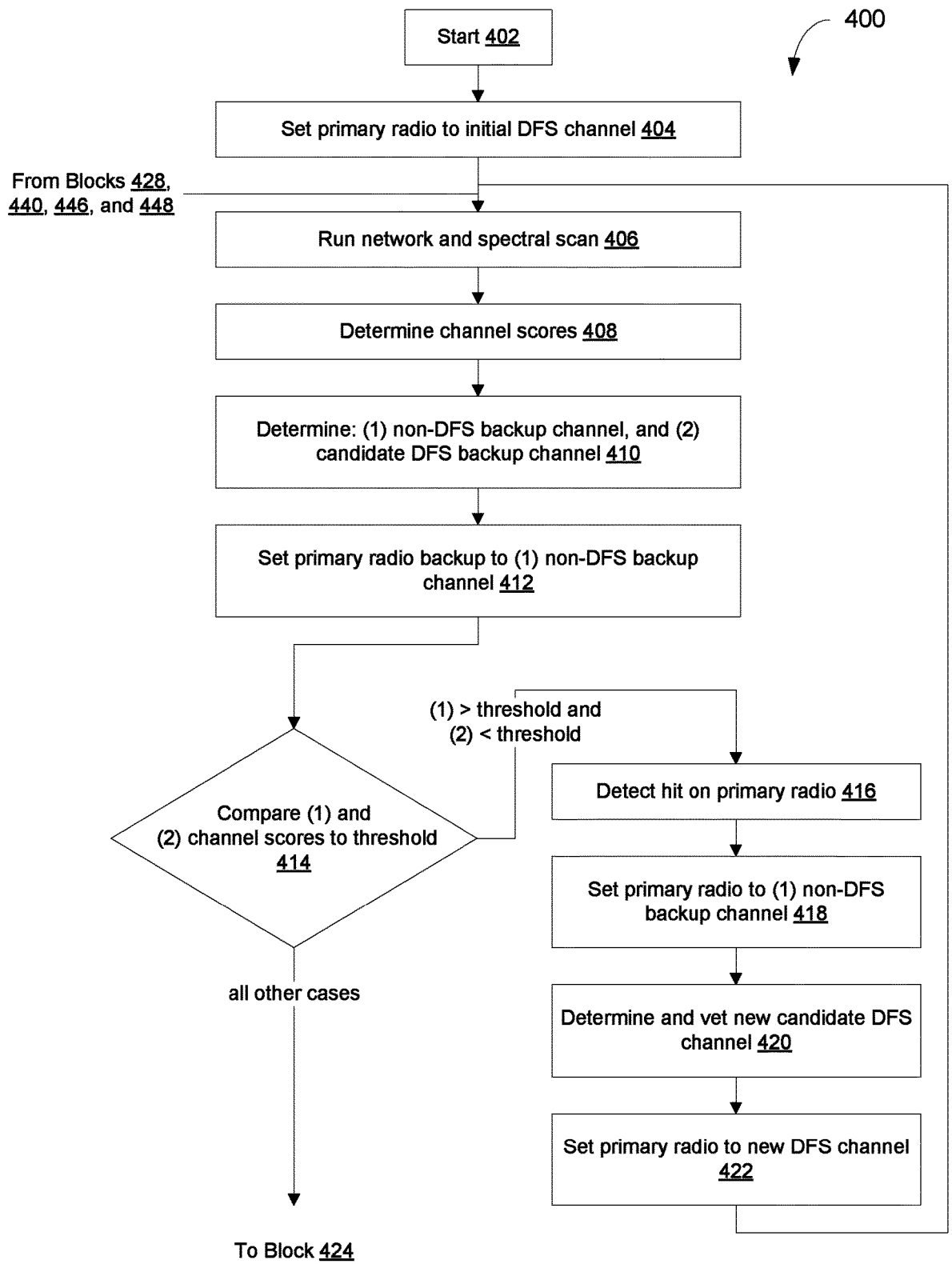
FIGS. 4A and 4B illustrate a flowchart of an example method of determining a backup channel for a wireless communication device according to embodiments of the present disclosure.
Figure 4B:
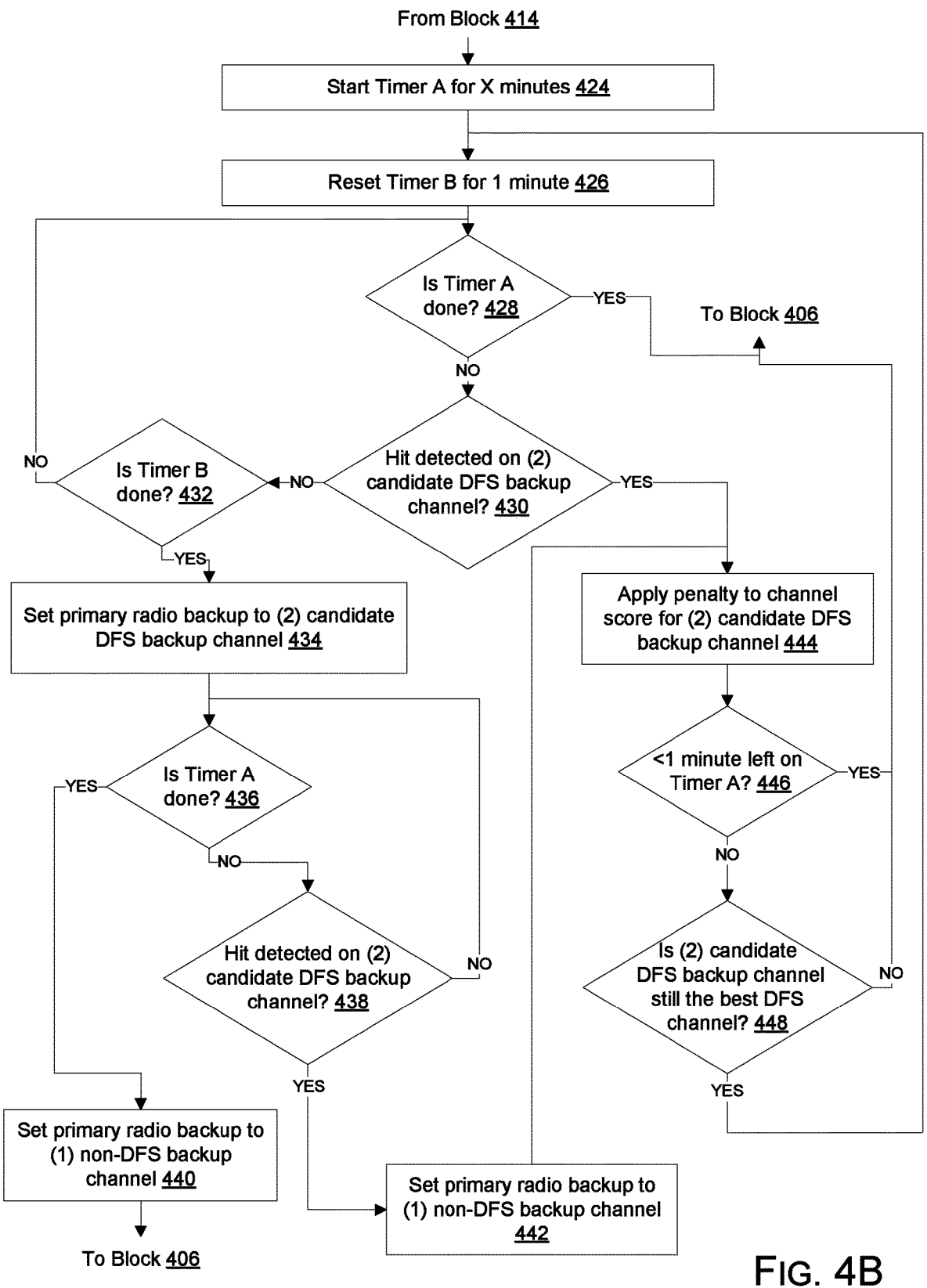

FIGS. 3, 4A and 4B illustrate example methods 300 and 400 according to embodiments of the present disclosure. Methods 300 and 400 may be performed by one or more computing devices or systems, such as system 100 and computing device 200 described with respect to FIGS. 1 and 2 respectively. The flowchart of FIGS. 3, 4A, and 4B are representative of machine readable instructions that are stored in memory (such as memory 220 of computing device 200) and may include one or more programs which, when executed by a processor (such as processor 210 of computing device 200) may cause one or more systems or devices to carry out one or more functions described herein. While the example program is described with reference to the flowchart illustrated in FIGS. 3, 4A, and 4B, many other methods for carrying out the functions described herein may alternatively be used. For example, the order of execution of the blocks may be rearranged or performed in series or parallel with each other, blocks may be changed, eliminated, and/or combined to perform methods 300 and 400. Further, because methods 300 and 400 are disclosed in connection with the components of FIGS. 1-2, some functions of those components will not be described in detail below.

In an example embodiment, methods 300 and 400 may be carried out by a wireless communication device having a primary radio and a secondary radio. Method 300 begins at block 302. At block 304, method 300 includes operating the primary radio on a current operating channel. The primary radio can also have a backup channel. The determination of a backup channel is discussed in further detail with respect to FIGS. 4A and 4B.

At block 306, method 300 may include determining whether or not to switch the current operating channel of the primary radio. The wireless communication device may be configured to switch the current operating channel of the primary radio to the backup channel under various circumstances. For example, if a primary radio event is detected on the current operating channel when the current operating channel is a DFS channel, the primary radio may be switched to the backup channel. A primary radio event can refer to the detection of a radar signal on the current operating channel of the primary radio. A primary radio event can also include detecting a channel change of the primary radio initiated by a user or other controller of the primary radio. Further, a primary radio event can include the detection of interference above a threshold level, or some other consideration with respect to the primary radio that indicates that the primary radio should be switched off of the current operating channel. In this disclosure, the examples may be disclosed with specific reference to the primary radio event being the detection of a radar signal on the current operating channel. However, it should be appreciated that this is for illustration only, and that the primary radio event can include various other detections, considerations, and determinations as noted above.

In a second example, the wireless communication device may monitor the characteristics of the current operating channel, and determine that the current operating channel has fallen below a threshold score. This may be an internal determination, not based on any government regulation or requirement. When the current operating channel experiences a "channel discomfort index" hit, or some event that causes the current operating channel score to drop, the wireless communication device may switch the primary radio to the backup channel. Example factors that may be considered in determining the channel discomfort index can include any of the factors used to determine the channel scores, such as such as (1) the channel quality, which may measure a current relative quality of the channel as determined by the percentage of packet retries, the current noise floor, and the duty cycle of various devices on the channel (i.e., non-Wi-Fi devices), (2) the availability, which may measure the percentage of the channel currently available for use, (3) the utilization, which may measure the percentage of the channel being used, (4) the Wi-Fi utility, which may measure the percentage of the channel being used by Wi-Fi devices (where appropriate), and (5) the interference utility, which may measure the percentage of the channel being used by non Wi-Fi interference and Wi-Fi ACI (adjacent channel interference) (where appropriate). Other characteristics may be considered as well. Further examples can include various other reasons for switching the primary radio to the backup channel.

At block 308, method 300 includes switching the primary radio current operating channel to the backup channel. Method 300 then ends at block 310.

Method 400 illustrates how a backup channel is determined for the primary radio, and how the backup channel is changed under certain circumstances (i.e., upon detection of a radar signal on the candidate DFS backup channel, based on the passage of time since a last network scan, etc.). As noted with respect to FIG. 3, the primary radio may be configured to automatically switch to the backup channel (i.e., either a non-DFS backup channel or a DFS backup channel) upon the detection of radar signal on the initial DFS channel. Method 400 provides an example for how the backup channel is determined. Method 400 may start at block 402.

At block 404, method 400 may include setting the primary radio to an initial DFS channel. As noted above, the DFS channel may be a dynamic frequency selection channel that provides improved operational characteristics as compared to the alternative, or a non-DFS channel.

At block 406, method 400 may include running network and spectral scans. The network and spectral scans provide information about interference, signal strength, and other signal and channel characteristics that can be used to determine the quality and rank of various available DFS and non-DFS channels. In some examples, network and spectral scans may be performed for all available DFS and non-DFS channels. Alternatively, some channels may not be included in the scans. For example, any channels listed on the non-occupancy list (NOL) may be excluded from the scans. The network and spectral scans may be performed by the secondary radio while the primary radio is operating on the initial DFS channel set at block 404.

At block 408, method 400 may include determining channel scores for one or more of the plurality of channels scanned at block 406. The channel scores can be based on data from the network and spectral scans, and in particular can include a weighted combination of the various information gathered in network and spectral scans. Method 400 may be iterative or looped over time, meaning that channel scores can reflect changes in channel information for the plurality of available channels (e.g., trends associated with various channels). Furthermore, channel scores can be used to rank the plurality of channels from best to worst, with the best channels providing better operational characteristics than the worst channels. In some examples, the DFS channels may be ranked separately from the non-DFS channels. Further, in some examples a channel may be preferred to another channel for one or more reasons. Even if a given channel does not have the highest channels score, it may still be a preferred channel for one or more reasons.

At block 410, method 400 may include determining a (1) non-DFS backup channel and (2) a candidate DFS backup channel. The non-DFS backup channel is placeholder for the primary radio, or a backup channel that the primary radio can switch to if there is a problem with the current operating channel of the primary radio (i.e., the initial DFS channel set at block 404). As compared to a DFS channel, the non-DFS backup channel will be always available, as there are no government restrictions requiring the primary radio to stop operating on a non-DFS channel. However, the non-DFS backup channel may provide worse operational characteristics than a DFS channel. The non-DFS backup channel may be the best ranked (or preferred) non-DFS backup channel according to the channel scores determined at block 408.

The candidate DFS backup channel is a DFS channel that will be vetted (i.e., blocks 424-448) to determine whether it should be set as the backup channel instead of the non-DFS backup channel. Method 400 prioritizes saving a DFS channel as the backup channel rather than a non-DFS channel. But DFS channels require additional vetting to be listed as a backup channel. The candidate DFS backup channel may be the best ranked (or preferred) available DFS channel. Some DFS channels may not be available, either because they are listed on the non-occupancy list, because they are adjacent to the initial DFS channel, of for some other reasons. In some examples, the candidate DFS backup channel (that the primary radio may use as a backup channel after vetting) may not be adjacent to the initial DFS channel determined in block 404 and set as the current operating channel of the primary radio. In this case, if the best ranked (or preferred) candidate DFS channel according to the channels scores and various other factors is adjacent to the currently in use initial DFS channel, the candidate DFS channel may instead be determined to be the second best DFS channel, or the next best available DFS channel if the second best DFS channel is also adjacent to the initial DFS channel, or if it is on the non-occupancy list. Furthermore, some DFS channels may be removed from consideration as a candidate DFS backup channel if they have certain other characteristics, such as if they are 10-minute CAC (channel availability check) channels requiring additional time for vetting. As noted above, if there is an issue with the current operating channel of the primary radio, it may be preferred to switch to a backup DFS channel rather than a backup non-DFS channel. However, the backup DFS channel must be vetted before it can be switched to, whereas the non-DFS channel does not need to be vetted before switching.

Thus, before the candidate DFS channel is vetted, the backup channel for the primary radio is set to the non-DFS backup channel at block 412. This enables the primary radio to continue to operate using the DFS channel, and have the best (or preferred) non-DFS backup channel as a backup in case the primary radio is either required to switch (i.e. due to government regulations mandating a switch upon detection of another radar signal on the current operating channel) or if the channel score of the initial DFS channel is below a threshold score, indicating that the initial DFS channel quality is bad.

Method 400 then proceeds to block 414, wherein a decision is made based on the quality (e.g., channel scores) of the non-DFS backup channel and the candidate DFS backup channel. If the non-DFS backup channel quality is considered good (i.e., above a first threshold score), and the candidate DFS channel is considered bad (i.e., below a second threshold score) method 400 may proceed to block 416. This can occur where there are no available DFS channels with good enough quality. The first threshold score and the second threshold score may be the same, or may be different. A determination whether a channel quality is "good" or "bad" is a relative determination. It should be appreciated that these labels correspond to determinations that can consider multiple different factors, and that a given channel may be considered good in one context, and bad in another context.

At block 416, method 400 may include the primary radio continuing to operate on the initial DFS channel set at block 404 until a "hit" or radar signal is detected on the primary radio. The "hit" may be the detection of a radar signal on the current operating channel of the primary radio.

When a hit is detected at block 416, block 418 of method 400 may include switching the primary radio current operating channel to the backup channel, which is the non-DFS backup channel determined at block 410 and set as the backup at block 412.

At block 420, method 400 may then include determining and vetting a new candidate DFS channel. This can include determining the best ranked (or preferred) DFS channel (even if there are no available DFS channels above a threshold channel score). Vetting the new candidate DFS channel can include monitoring the new candidate DFS channel for a period of time (e.g., 1 minute) to ensure that there are no hits or radar signals detected. The monitoring can be done by the secondary radio while the primary radio continues to operate using the non-DFS backup channel.

Once a new candidate DFS channel is determined and vetted at block 420, method 400 can include switching the current operating channel of the primary radio to the new candidate DFS channel at block 422. Method 400 then proceeds back to block 406 to repeat the network and spectral scans.

At block 414, if any other determination is made (i.e., anything other than that the non-DFS backup channel is above the first threshold score and that the candidate DFS backup channel is below the second threshold score), method 400 may instead proceed to block 424.

At block 424, method 300 includes starting a first timer (i.e., Timer A) for a predetermined period of time (e.g., X minutes). The first time can be set for an amount of time that corresponds to the length of time that the network and spectral scans performed at block 406 remain accurate and valid, and that the channel scores are still accurate and valid. For example, Timer A may be set to ten minutes. After the ten minutes elapses since the network and spectral scans were done, and the channel scores were calculated, it may be beneficial to perform additional network and spectral scans to determine updated channel scores. This decision making is reflected in blocks 428 and 436, discussed below.

Blocks 426, 428, 430, and 432 comprise an initial vetting procedure for the candidate DFS backup channel determined at block 410. The initial vetting procedure performs a check on the candidate DFS backup channel to ensure that no radar signal or hit is detected for a prescribed period of time (e.g., one minute). This initial vetting procedure must be completed before the primary radio can switch to the candidate backup DFS channel. In some examples, the initial vetting procedure includes a determination that one minute has elapsed without the detection of radar signal on the candidate DFS backup channel.

At block 426, method 400 may include resetting a one minute timer (i.e., Timer B). Timer B is set to one minute based on government requirements for monitoring DFS channels before the primary radio can be switched onto a given DFS channel. As such, the one minute time period for Timer B is merely an example, and it should be appreciated that other durations of time can be used as well.

At block 428, method 400 includes determining whether Timer A has reached its end, or whether Timer A is done. As noted above, if Timer A is done, that indicated that the scans completed at block 406 and the channels scores determined at block 408 are "old" or no longer accurate. In this case, method 400 proceeds back to block 406 to run a new network scan and spectral scan, and determine new updated channel scores. Because the quality of channels, operational environment, and other aspects change over time, Timer A enables the wireless communication device to update the scans and channel scores every so often as the channel characteristics change.

At block 430, method 400 includes checking whether a radar signal or "hit" has been detected on the candidate DFS backup channel. This is done via the secondary radio, while the primary radio continues to operate on the initial DFS channel determined at block 404. If no hit is detected at block 430, method 400 proceeds to block 432 wherein it is determined whether Timer B is done (e.g., whether 1 minute has elapsed). If timer B is not done, method 400 proceeds back to block 428. Blocks 328, 330, and 332 form a loop that repeats for the duration of Timer B (e.g., one minute), so long as no hit is detected on the candidate DFS backup channel. This loop can be repeated at a regular interval, such that block 430 is repeated every 5 seconds, 10 seconds, or at some other interval. In other words, blocks 428, 430, and 430 for a loop that checks the candidate DFS backup channel for a radar signal at a regular interval during a first period of time (i.e., until Timer B is done).

If no hit is detected for the duration of Timer B (e.g., no hit detected for one minute) while time remains on Timer A, that indicates that the candidate DFS backup channel is available to be switched to. Method 400 then includes setting the backup channel for the primary radio to the candidate DFS backup channel at block 434.

Alternatively, if a hit is detected on the candidate DFS backup channel before Timer B has expired, method 400 may proceed to block 444. Block 444 is described in further detail below.

Returning to block 434, method 400 includes setting the candidate DFS backup channel as the primary radio backup channel. Method 400 then continues to monitor the candidate DFS backup channel (now set as the primary radio backup channel) to ensure that the candidate DFS backup channel continues to be available and that no radar signal or hit is detected.

Blocks 436 and 438 comprise a continued vetting procedure for the candidate DFS backup channel, which immediately follow the initial vetting procedure of blocks 428, 430, and 432. The continued vetting procedure continues to monitor the candidate DFS backup channel and ensures that it remains available to be switched to if a hit is detected on current operational channel of the primary radio.

Block 436 includes determining whether Timer A has expired (i.e., whether the network and spectral scans and channel scores are still accurate). If Timer A has not expired (i.e., the scans and channel scores are still valid), block 438 includes determining whether a radar signal or hit has been detected on the candidate DFS backup channel (which is currently set as the primary radio backup channel).

If no hit has been detected at block 438, method 400 includes proceeding back to block 436 in a loop. The loop of the continued vetting procedure comprising blocks 436 and 438 includes checking the candidate DFS backup channel for a radar signal at a second regular interval, different from the first regular interval associated with the initial vetting procedure of blocks 428, 430, and 430. The second regular interval may be, for example, every second, such that during the continued vetting procedure the candidate DFS backup channel is monitored every second for a radar signal.

The loop of blocks 436 and 438 continues if there is no radar signal detected until Timer A runs out (i.e., until the scans and channel scores are no longer valid). Once Timer A runs out, determined at block 436, method 400 proceeds to block 440.

At block 440, method 400 includes setting the primary radio backup channel back to the non-DFS backup channel. This can be the non-DFS backup channel determined at block 410. Method 400 then proceeds back to block 406, so that new network and spectral scans can be done and new channel scores can be determined.

In other words, blocks 436, 438 continue to loop if no radar signal is detected until Timer A expires, at which time method 400 includes responsively restarting the method at the scanning step of block 406.

If, however, during the continued vetting procedure of blocks 436 and 438, a hit is detected on the candidate DFS backup channel, method 400 may instead proceed to block 442. At block 442, the primary radio backup channel is set back to the non-DFS backup channel. In other words, upon detecting a radar signal on the candidate DFS backup channel during the second period of time, method 400 includes responsively resetting the primary radio backup channel to the non-DFS backup channel. Method 400 then proceeds to block 444.

At block 444, method 400 includes applying a penalty to the channel score for the candidate DFS backup channel (because a radar signal or hit was detected). The penalty reduces the channel score of the candidate DFS backup channel. The reduced channel score may result in the candidate DFS backup channel no longer being the best (or preferred) DFS channel for switching the primary radio to when a radar signal is detected on the current operating channel of the primary radio (i.e., the candidate DFS backup channel may no longer be the best ranked DFS channel). As such, the wireless communication device may instead prefer a different DFS channel as a candidate DFS backup channel. In some examples, the penalty may be a subtraction to the channel score (where a higher channel score is preferred) associated with the particular channel. In other examples, the penalty may be a multiplier or scale applied to the score.

If there is less than one minute left on Timer A (i.e., less than a full Timer B amount left on Timer A), method 400 proceeds back to block 406 to restart the scans. This is because it is no longer possible for a full initial vetting procedure of Timer B (i.e., one minute) to be completed for the candidate DFS backup channel without Timer A running out and requiring new scans and channel scores to be determined. As such, method 400 simply reverts to block 406 to run new scans and determine updated channel scores.

Alternatively, if at block 446 there is more than one minute left on Timer A (i.e., more than a full Timer B amount left on Timer A), that means that the candidate DFS channel may still be vetted under the initial vetting procedure while the scanned information and channel scores are still valid. In this case, method 400 proceeds to block 448.

At block 448, method 400 includes determining whether the candidate DFS backup channel, including the newly updated channel score based on the added penalty, is still the preferred DFS channel. This block determines whether the candidate DFS backup channel is still the preferred backup DFS channel, or whether there is a better ranked (or more preferred) DFS channel that could act as the backup DFS channel for the primary radio. If there is a better ranked DFS channel according to the channel scores, method 400 proceeds back to block 406 to run a new scan and restart the method using the new candidate DFS channel.

Alternatively, if at block 448 the candidate DFS channel is still the preferred DFS channel even including the added penalty, and there is still a sufficient amount of time left on Timer A (e.g., more than a full Timer B amount) method 400 proceeds back to block 426 to restart the initial vetting procedure using the same candidate DFS backup channel.

While one or more specific embodiments have been illustrated and described in connection with the invention(s), it is understood that the invention(s) should not be limited to any single embodiment, but rather construed in breadth and scope in accordance with recitation of the appended claims.

What is claimed is:

1. A method for wireless communication comprising:
   setting a current operating channel of a primary radio to a DFS channel;
   scanning a plurality of available channels using a secondary radio;
   determining a channel score for each of the available channels;
   determining a non-DFS backup channel for the primary radio based on the channel scores;
   determining a candidate DFS backup channel for the primary radio based on the channel scores;
   setting a primary radio backup channel to the non-DFS backup channel; and
   while operating the primary radio on the DFS channel,
     vetting the candidate DFS backup channel using the secondary radio;
     detecting a primary radio event on the current operating channel of the primary radio; and
     responsive to both vetting the candidate DFS backup channel and detecting the primary radio event, switching the current operating channel of the primary radio from the DFS channel to the candidate DFS backup channel.

2. The method of claim 1, further comprising:
   determining that (1) the channel score for the non-DFS backup channel is greater than a first threshold channel score, and (2) the channel score for the candidate DFS backup channel is less than a second threshold channel score;
   after determining (1) and (2), detecting a primary radio event on the current operating channel of the primary radio; and
   responsively:
     switching the current operating channel of the primary radio to the non-DFS backup channel;
     determining a new DFS channel;

vetting the new DFS channel; and
after vetting the new DFS channel, switching the current operating channel of the primary radio to the new DFS channel.

3. The method of claim 1, wherein vetting the candidate backup DFS channel comprises an initial vetting procedure, wherein the initial vetting procedure comprises:
checking the candidate DFS backup channel for a radar signal during a first period of time.

4. The method of claim 3, wherein checking the candidate DFS backup channel comprises checking the candidate DFS backup channel at a regular interval during the first period of time.

5. The method of claim 3, the initial vetting procedure further comprising:
failing to detect a radar signal on the candidate DFS backup channel during the first period of time; and
responsively setting the primary radio backup channel to the candidate DFS backup channel.

6. The method of claim 3, the initial vetting procedure further comprising:
detecting a radar signal on the candidate DFS backup channel during the first period of time; and
responsively modifying the channel score of the candidate DFS backup channel.

7. The method of claim 6, the initial vetting procedure further comprising:
after modifying the channel score of the candidate DFS backup channel, (1) determining that the candidate DFS backup channel remains a preferred candidate DFS backup channel based on the channel scores, and (2) restarting the initial vetting procedure.

8. The method of claim 3, wherein vetting the candidate backup DFS channel further comprises a continued vetting procedure, wherein the continued vetting procedure immediately follows the initial vetting procedure.

9. The method of claim 8, wherein the continued vetting procedure comprises checking the candidate DFS channel for a radar signal at a second regular interval.

10. The method of claim 8, wherein the continued vetting procedure further comprises:
failing to detect a radar signal on the candidate DFS backup channel during a second period of time; and
responsively restarting the method at the scanning step.

11. The method of claim 8, wherein the continued vetting procedure further comprises:
detecting a radar signal on the candidate DFS backup channel during the second period of time; and
responsively resetting the primary radio backup channel to the non-DFS backup channel.

12. The method of claim 8, wherein the continued vetting procedure further comprises:
detecting a radar signal on the candidate DFS backup channel during the second period of time; and
responsively modifying the channel score of the candidate DFS backup channel;
determining that the candidate DFS backup channel remains a preferred candidate DFS backup channel based on the channel scores; and
restarting the initial vetting procedure.

13. A wireless communication device comprising:
a primary radio;
a secondary radio; and
a processor configured to:
set a current operating channel of the primary radio to a DFS channel;
scan a plurality of available channels using the secondary radio;
determine a channel score for each of the available channels;
determine a non-DFS backup channel for the primary radio based on the channel scores;
determine a candidate DFS backup channel for the primary radio based on the channel scores;
set a primary radio backup channel to the non-DFS backup channel; and
while operating the primary radio on the DFS channel, vet the candidate DFS backup channel using the secondary radio;
detect a primary radio event on the current operating channel of the primary radio; and
responsive to both vetting the candidate DFS backup channel and detecting the primary radio event, switch the current operating channel of the primary radio from the DFS channel to the candidate DFS backup channel.

14. The wireless communication device of claim 13, wherein vetting the candidate backup DFS channel comprises an initial vetting procedure, wherein the initial vetting procedure comprises:
checking the candidate DFS backup channel for a radar signal at a regular interval during a first period of time.

15. The wireless communication device of claim 14, the initial vetting procedure further comprising:
failing to detect a radar signal on the candidate DFS backup channel during the first period of time; and
responsively setting the primary radio backup channel to the candidate DFS backup channel.

16. The wireless communication device of claim 14, the initial vetting procedure further comprising:
detecting a radar signal on the candidate DFS backup channel during the first period of time;
responsively modifying the channel score of the candidate DFS backup channel; and
after modifying the channel score of the candidate DFS backup channel, (1) determining that the candidate DFS backup channel remains a preferred candidate DFS backup channel based on the channel scores, and (2) restarting the initial vetting procedure.

17. The wireless communication device of claim 14, wherein vetting the candidate backup DFS channel further comprises a continued vetting procedure, wherein the continued vetting procedure immediately follows the initial vetting procedure and comprises:
checking the candidate DFS channel for a radar signal at a second regular interval.

18. The wireless communication device of claim 17, wherein the continued vetting procedure further comprises:
failing to detect a radar signal on the candidate DFS backup channel during a second period of time; and
responsively restarting at the step of scanning the plurality of available channels using the secondary radio.

19. The wireless communication device of claim 17, wherein the continued vetting procedure further comprises:
detecting a radar signal on the candidate DFS backup channel during the second period of time;
responsively resetting the primary radio backup channel to the non-DFS backup channel;
responsively modifying the channel score of the candidate DFS backup channel;

determining that the candidate DFS backup channel remains a preferred candidate DFS backup channel based on the channel scores; and restarting the initial vetting procedure.

20. A non-transitory, computer readable medium having instructions stored thereon that, when executed by a processor, cause the performance of a set of actions comprising:

setting a current operating channel of a primary radio to a DFS channel;

scanning a plurality of available channels using a secondary radio;

determining a channel score for each of the available channels;

determining a non-DFS backup channel for the primary radio based on the channel scores;

determining a candidate DFS backup channel for the primary radio based on the channel scores;

setting a primary radio backup channel to the non-DFS backup channel; and while operating the primary radio on the DFS channel, vetting the candidate DFS backup channel using the secondary radio;

detecting a primary radio event on the current operating channel of the primary radio; and responsive to both vetting the candidate DFS channel and detecting the primary radio event, switching the current operating channel of the primary radio from the DFS channel to the candidate DFS backup channel.

* * * * *